July 6, 1948.　　　J. M. ANDERSON　　　2,444,549
POLYNOMIAL EQUATION COMPUTER
Filed Oct. 28, 1944　　　　　　　　　　　2 Sheets-Sheet 1
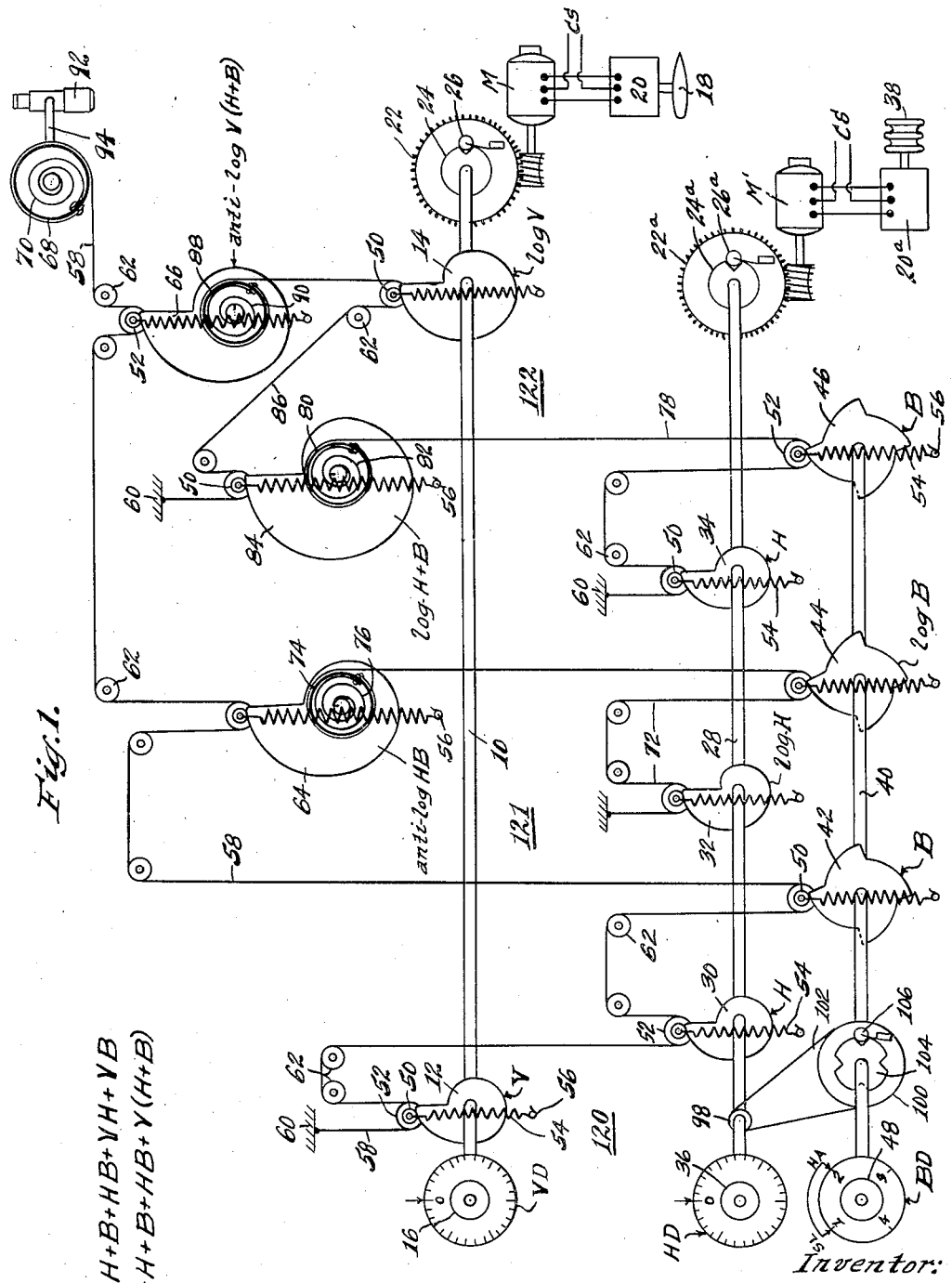

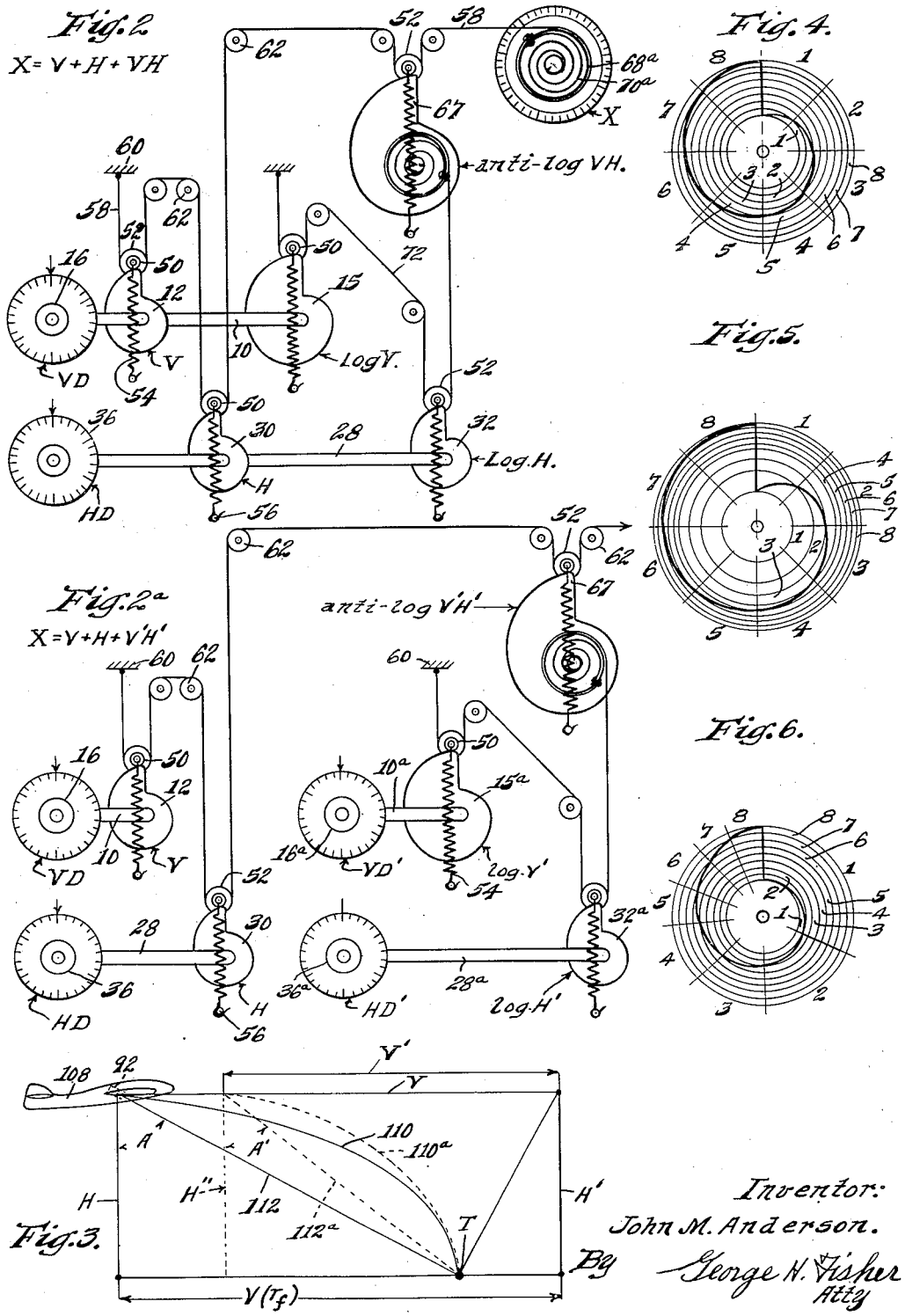

Patented July 6, 1948

2,444,549

UNITED STATES PATENT OFFICE 2,444,549

POLYNOMIAL EQUATION COMPUTER

John M. Anderson, Minneapolis, Minn., assignor to Minneapolis-Honeywell Regulator Company, Minneapolis, Minn., a corporation of Delaware Application October 28, 1944, Serial No. 560,802

5 Claims. (Cl. 235—61)

This invention relates to a computer which may be used to evaluate complex mathematical expressions involving both addition and multiplication.

One object of the invention is to provide a computer which uses cams that can be cut to represent any function of a variable, empirical or otherwise, whether it can be reduced to a specific equation or can only be treated statistically.

Another object is to provide a computer wherein a cross-product of two variable quantities may be added into the result by utilizing a cam for each quantity that is contoured in accordance with the logarithm of the quantity, the cross-product being taken from a further cam that is cut to an anti-logarithm contour.

Still another object is to provide a mechanical computing device in which linear movement is brought about proportionately to the algebraic sum of a number of factors, which factors themselves may be products computed in the same manner as the computation of the sum.

A further object is to provide a summation cord or wire anchored at one end and attached to a movable indicating or control device at the other end. The summation cord passes around a plurality of stationary pulleys, and around the pulleys of a plurality of cam followers, which may coact with cams that can be set manually, or may be automatically set to values which are functionally related to the magnitudes of a plurality of conditions, such as pressures, temperatures or the like, whereby the cam followers assume various positions due to deviations of the cams from their respective initial positions, the effective length of the cord between the anchor and the indicator varying with the positions of the several cam followers.

Still a further object is to provide a mechanism that effects addition of a plurality of variable quantities and multiplication of each of the quantities by each of the remaining variables through the use of cams contoured linearly (for addition), logarithmically (for multiplication) and contoured in accordance with some characteristic other than linearly or logarithmically, such as in accordance with the trajectory of a bomb or other missile, certain of the cams being interconnected for a similar set-up of a variable on both the addition and multiplication cams, and a further interconnection being provided between certain of the cams where necessary in connection with the particular problems to be solved by the computer.

An additional object is to provide a computer having a cam arrangement which makes it possible to work from arrays of data other than those requiring summation multiplication, for example, is effected by adding the logarithms of the numbers to be multiplied, then operating an antilogarithmic cam therefrom, and changing the length of the summation cord in accordance with the rise of the antilogarithmic cam.

Still other objects are to provide an assortment of linear and logarithmic cams to change the length of a summation cord, a means to operate the cams in groups by automatic means or manual setting knobs, and an arrangement of one set of cams having contours that depart from linear or logarithmic outlines which make it possible to set into the instrument a characteristic of one of the variables, as on a cam that has a plurality of lobes contoured to the characteristic of various factors such as different sizes and types of bombs.

A still further object is to provide an assortment of cams, some of which may be contoured in accordance with a constant determined by techniques of statistical curve fitting and some of which may be contoured by combining various degrees of a given variable in a functional relation.

With these and other objects in view, my invention consists in the construction, arrangement and combination of the various parts of my device whereby the objects contemplated are attained, as hereinafter more fully set forth, pointed out in my claims and illustrated in the accompanying drawings wherein:

Fig. 1 is a diagrammatic view of a computer embodying my invention and which is capable of solving the formula:

$$X = V + H + B + HB + VH + VB$$

and illustrating the solution being utilized to perform a control function such as, in part, setting the angle of a bombsight relative to an airplane.

Fig. 2 is a diagrammatic view somewhat similar to Fig. 1 showing a mechanism capable of solving the formula $X = V + H + VH$, and illustrating the solution being utilized merely for indicating purposes.

Fig. 2a is a view similar to Fig. 2 showing a modification thereof.

Fig. 3 is a geometric diagram illustrating how the present computer operation applies to a bombsight installation.

Fig. 4 is a diagram showing the layout of an addition cam involved in my computer, or one that is laid out linearly.

Fig. 5 is a similar view of a multiplication cam or one that is laid out logarithmically; and Fig. 6 is a similar view of an anti-log cam showing its layout. The principles illustrated in Figs. 4, 5 and 6 can be applied to laying out a cam involving any functional relation.

In describing my invention I have, merely by way of illustration, applied it to the calculation of a formula involved in the angular setting (in a vertical fore-and-aft plane) of a bombsight relative to an aircraft in order to insure that the bomb will hit the target after being released from the plane. The invention, however, is not limited to this application as it may be used wherever a mixed assortment of factors is used in an equation involving both addition and multiplication, and further involving a factor that is neither linear nor logarithmic, but is functionally more complicated as involving squares or cubes or other mathematical relationships. The equations can also involve certain characteristics which have been determined statistically or otherwise.

In connection with the calculation of the time of fall of a bomb there are at least three factors which enter into the equation. The first of these is velocity, the second altitude and the third is the trajectory characteristic of the particular bomb being dropped. Other factors such as wind speed and direction, etc., affect the calculation, but reference thereto will be omitted from my specification as it deals merely with one example of use to which my computer can be put. The trajectory characteristic is a result of size, air resistance, etc., and, in general, the larger the bomb the greater its air resistance, and, hence, the shorter its trajectory. The trajectory of the different types of bombs can be determined by observation and plotted, and then a cam can be contoured to correspond to the trajectory, as will hereinafter appear.

To begin with, the above stated relation can be simplified as follows: time of fall $$(T_f) = V + H + B + HB + V(H + B)$$

This relation results from a statistical fitting of the multi-dimensional surface defined by the variables $T_f$, $V$, $H$ and $B$, using standard mathematical techniques. In the formula as simplified the symbol "$V$" indicates the functional dependence of $T_f$ on velocity determined by the statistical fitting process. For example, in this case the variable quantity "$V$" is a complicated term involving constants, and first and second degree relations of a primary variable $v$ (velocity), that is, $V = av + bv^2$. Similarly, the variable quantity $H$ is a complicated term involving constants, first and second degree relations, and so on, of a primary variable $h$ (altitude). The cams are contoured in accordance with explicit values in each case, but for clarity, reference to the functional relations mentioned in these values are implicit in the following description.

With the relation $T_f = V + H + B + HB + V(H + B)$ in mind I shall now proceed to describe my computer and apply the formula thereto. A shaft 10 has a pair of cams 12 and 14, each of which may be considered a velocity cam, the cam 12 being therefore termed a "V" cam and the cam 14 a "log V" cam for a purpose which will hereinafter appear. A velocity dial VD is secured to the shaft 10 and has a knob 16 for rotating it. The dial may be calibrated as in M.P.H. so that the knob 16 can be set for the instantaneous speed of the aircraft as it approaches the target.

Instead of manually setting the shaft 10 it may be automatically set, as by a motor M, controlled by an air speed responsive means 18 through a suitable electrical apparatus or the like 20 for translating speed into automatic positioning of a worm gear 22. The worm gear 22 drives the shaft 10 through an indexing clutch consisting of a notched disc 24 on the shaft 10 and a spring biased roller 26 carried by the worm gear. The current supply for the motor and the apparatus 20, as well as other motors and electrical apparatus later to be described, is indicated at CS.

A shaft 28 is provided having three cams 30, 32 and 34, which are H, log H and H cams respectively, H being the symbol of the function of altitude or height above the target. An altitude dial HD is secured on the shaft 28, and a knob 36 is provided for manually setting it in accordance with the altitude of the airplane as it approaches the target.

In addition to the altitude dial HD, or in place of it, an altitude responsive device 38, such as an aneroid or the like, may be provided which, through suitable interposed mechanism 26a, operates a motor M' connected to drive a worm gear 22a on the shaft 28. The connection between the worm gear and the shaft includes a notched disc 24a having a spring biased roller 26a, as described in connection with the shaft 10.

A third shaft 40 is provided having thereon three cams 42, 44 and 46. These cams are provided with a plurality of lobes, four being shown by way of illustration and each lobe is contoured by the trajectory characteristic of one certain type of bomb or any other variable characteristic as desired. In general, the shortest lobe would correspond to a bomb having little air resistance, and the higher lobes would be contoured for the characteristics of other bombs having proportionately greater air resistance.

For setting the shaft 40 to the various types of bombs, a bomb selector dial BD is provided, and a knob 48 is secured thereto for rotating the shaft so that the shaft can be set for the different types of bombs, such as 1, 2, 3 or 4, any one of which may, at the moment, be carried for release from the particular airplane in which the computer is located.

Coacting with the cams 12, 30 and 42 are cam followers 50 in the form of rollers, and associated with each roller is a pulley 52 and a spring 54. The spring is connected with the cam follower, and the lower end of the spring is anchored as to a stationary point 56, to effect a close following of the followers relative to the cams.

A summation cord 58 is anchored to a stationary point, such as the frame 60 of the computer. The summation cord traverses the pulley 52 of the follower of cam 12, then passes over idler pulleys 62 to the follower of cam 30, then over additional idler pulleys to the follower of cam 42, and from there on to the followers of additional cams 64 and 66 which will later be described. The summation cord finally winds on a drum 68, the rotation of which is controlled by a spring 70 which gives an even tension on the summation cord 58. The cord 58 is preferably metallic in character, is stranded for greater flexibility, and is formed of the same material as the frame of the mechanism so as to eliminate errors due to temperature changes ambient to the computer. Errors introduced by stretching of the summation cord by the spring 70 subseqent to assembly are kept at a minimum by pre-stretching the cord. The spring tends to rotate the drum 68 counter-clockwise to keep the summation cord taut. The cord from 60 to past the follower of cam 42 represents the $V+H+B$ in the equation.

A sub-summation cord 72 is provided for operating the cam follower 50 of the cams 32 and 44. The sub-summation cord has one end anchored to the frame 60 and its other end is wound on a drum 74 which is spring rotated counter-clockwise by a spring 76. The drum 74 drives the cam 64, which may be termed an antilogarithmic cam: its follower is positioned in accordance with the sum of log H (cam 32) and log B (cam 44). The position of the follower of cam 64 therefore represents the product HB in the equation.

A second sub-summation cord 78, representing $H+B$, has one end anchored to the frame 60 of the computer and cooperates with the cam followers 50 of the cams 34 and 46 for operating a third drum 80, spring rotated counter-clockwise by a spring 82. The drum 80 drives a cam 84 which may be termed a logarithmic cam, its follower 50 is positioned in accordance with the logarithm of the sum of H and B given by the cams 34 and 46.

Finally, a third sub-summation cord 86 has one end anchored to the frame 60 of the computer and coacts with the cam followers 50 for the cam 84 and the cam 14 and drives a drum 88 which is spring-rotated counter-clockwise by a spring 90. The drum 88 drives the cam 66 according to the sum of log V and log $(H+B)$ and this cam positions the follower in accordance with the anti-logarithm of its rotation. The position of the follower of cam 66 therefore corresponds to $V(H+B)$ in the equation.

The summation cord 58, as has already been described, imparts rotation to a drum 68. The drum 68 may operate an indicator or a control device. In Fig. 1 I show a control device operable to position a telescope 92 in accordance with the position of the drum. This may be done by a direct mechanical connection, as by mounting the telescope on a shaft 94 of the drum 68 or through any intermediate means for mechanically or electrically amplifying the torque. The telescope 92 is shown merely by way of example as a device which is automatically controlled, in part, by the disclosed computer, and in the case of a bomb-sight the angle of the telescope relative to the airplane is set, in part, by the computer so that the target can be sighted through it, and when so sighted indicates that the bomb should be released to strike the target at the velocity and altitude of the airplane at that time.

Another feature of the present invention which makes it particularly adaptable as a computer for bomb-sights is an interconnection between the shafts 28 and 40. The trajectory pattern of a bomb may be set up on the bomb dial BD and thereafter the particular position of the cams 42, 44 and 46 are automatically set as to the altitude of the airplane.

The interconnection between the shafts 28 and 40 may be by any suitable means. By way of illustration, sprockets 98 and 100, and a chain 102, are indicated. An indexing clutch in the form of a notched disc 104 and a spring-pressed roller 106 is provided for driving the shaft 40 from the sprocket 100 in any one of four positions corresponding to the four lobes of the cams 42, 44 and 46. For the particular computer illustrated the drive ratio between the shafts 28 and 40 would be 4 to 1, whereas if a greater number of bomb types could be set up on the mechanism there would be a greater number of lobes and a corresponding greater speed ratio between the shafts.

In Fig. 2, I have illustrated a somewhat simpler computer for solving only a portion of the equation which can be solved by the computer of Fig. 1. This simple computer is for solving $X=V+H+VH$. Many parts of Fig. 2 correspond to Fig. 1 and have the same numerals, except for a cam 15 which is contoured to correspond to the logarithm of V and a cam 67 which is an antilogarithmic cam corresponding in this instance to VH.

Instead of a control device, the summation cord 58 rotates only an indicator disc, which disc gives a direct reading of X. The purpose of this figure is to illustrate my invention in its simplest form where two numbers are added and a product is added with them, wherein the product is that of the two numbers themselves. In that case the cams 15 and 32 are operated by the same control knobs 16 and 36 as the cams 12 and 30, whereas if different factors were to be set up on the cams 15 and 32 they would be provided with individual control knobs, as illustrated in Fig. 2a. The individual V and H dials in this case for the cams 15 and 32 are indicated at VD' and HD', the cams as V' and H', and their control knobs as 16a and 36a.

The various cams in my invention are contoured in accordance with certain considerations. An addition cam, such as 12 or 30, has, in general, a linear radial progression per unit of circumferential progression. This may or may not be modified by a constant or a functional relation in the fundamental equation, such as one involving first and second degree relations, as already mentioned. Cams for use in computers of the general type discussed above are shown in Figures 4, 5 and 6. It must be realized that in a computer for solving a particular problem the rise of "linear" cam 12, for example, may have to be linear with the variable quantity, that is, with $av+bv^2$, rather than with the primary variable $v$ itself. The same of course holds true of linear cams 30 and 34. Likewise the rise of "logarithmic" cam 14, for example, may have to be logarithmic with the variable quantity rather than with the primary variable. For the sake of clarity of illustration, the cams of Figures 4, 5 and 6 are shown as having rises which are simply linear, logarithmic or antilogarithmic with the rotation of the cam.

A "linear" cam is illustrated in Fig. 4 wherein annular spaces 1 to 8 are equal in radial width, and the cam is equally divided into eight angular parts, also numbered 1 to 8, with the contour of the cam being through the intersections, to give equal radial movement for the cam followers per degree of rotation of the cam. The radial dimensions may be multiplied by any constant to properly relate this cam to the others in the computer.

The log cams such as 32 and 84 have the logarithmic progression illustrated in Fig. 5 wherein the radial progression is logarithmic as compared to linear circular progression. It will be noted that the radial progression decreases toward the outside of the cam.

The anti-log cams such as 64 and 66 likewise have a logarithmic progression but it is circumferential, as shown in Fig. 6, with the greatest progression toward the inner end of the cam, the radial progression being linear. Thus the addition, log and anti-log cams are contoured mathematically. Their operation is such that when the anti-log cam is rotated by one or more log cams, the rise of its follower 50 is proportional to the number the sum of their logarithms, and such number is added into the result along with the added factors such as taken from cams 12, 30 and 42. Thus when log H is added to log B on cams 32 and 44 to give a total travel of sub-summation cord 72, this cord rotates anti-log cam 64 and cord 56 travels proportionally to the product HB.

As to the bomb characteristic cams 42 and 46 they are contoured empirically or statistically in accordance with the trajectory characteristics of the individual bomb types. The cams have linear progression modified by interposing thereon the trajectory pattern of the particular bomb for each lobe. The progression of the cam 44 is logarithmically modified by the trajectory pattern.

In order to more clearly show the factors involved, reference is made to Fig. 3 wherein an airplane 108 has a bombsight in it including the telescope 92 and the telescope is set at angle A relative to the vertical line H indicating altitude. The figure illustrates the craft at the proper instant of release for a bomb which is to strike the target T, on which the telescope is trained. The velocity of the airplane, which also partly determines the time of fall ($T_f$), may be indicated by the line V, and it will be noted that the target is between the present position of the airplane and a line H' which indicates the point which the airplane will reach when the bomb hits the target. The trajectory for the bomb is represented by the line 110 and this pattern in relation to the straight line of sight 112 determines the modification of the cam lobes on cams 42 and 46 from linear progression and the departure thereof from logarithmic progression for the cam 44. In general, if the bomb has greater air resistance, then the airplane 108 should be closer to the target at the time of release, such as at the dotted line H''. The target in that case would be hit by a bomb having a trajectory pattern indicated by the dotted line 110a. The cam lobe for this bomb characteristic would accordingly be higher (to conform to the trajectory 110a) than for the trajectory 110.

*Practical operation*

In the operation of my computer, assuming that the dials VD, BD and HD are manually operated, the knob 16 can be manipulated to move the dial VD to correspond to the instantaneous air speed of the plane as read from an air speed indicator by the bombardier. The dial HD can be set for the instantaneous altitude of the airplane as read from an altimeter. The dial BD can be set for whatever type of bombs happens to be in the bomb bay. The selected index on the dial will lie between an index arrow SL, indicating sea level, and a similar index arrow HA, indicating high altitude, the bomb types being indicated 1, 2, 3 and 4. When the indexing clutch 104, 106 snaps into position the bombardier knows that the shaft 40 is properly positioned with relation to the shaft 28, which shaft is, of course, positioned in relation to altitude as set by the position of shaft 28 through the mechanical connection 98—100—102.

These settings cause the cams 12, 30 and 42 to unreel a length of the summation cord 58 relative to the drum 68 which corresponds to the $V+H+B$ portion of the equation $X$ (or $T_f$) = $V+H+B+HB+V(H+B)$. Cams 32 and 44 unreel a length of summation cord 72 relative to drum 76 which corresponds to the sum of log H and log B: this rotates cam 64 and results in rotation of the antilogarithmic cam 64 to add the product of H and B to the result affecting the summation cord 58 and hence affecting the drum 68.

The cams 34 and 46 unreel a length of summation cord 73 relative to drum 80 which corresponds to the sum of H and B: this rotates drum 80 and results in rotation of logarithmic cam 84 so the cord 86 is affected by an amount log $(H+B)$. Cam 14 affects cord 86 by an amount log V and drum 88 is thus rotated by an amount log $(H+B) + \log V$. By this action antilogarithmic cam 66 unreels a length of summation cord 58 which corresponds to $V(H+B)$. The cam 84 with the multiplication cam 14 will add the log of $H+B$ to the log of V and affect the anti-log cam 66 whereby the result of $V(H+B)$ is added on the drum 68. All of the cams therefore enter into the positioning of the drum 68 and therefore of the telescope 92 at the proper sighting angle in accordance with the equation given above.

If a simple equation is to be solved the computer need not be as complicated as in Fig. 1, Fig. 2, for example, illustrating a much simpler arrangement involving only five cams and the indicating dial X on which the result can be read instead of operating a control device. Fig. 2a illustrates how the computer can be further modified to solve a formula such as $$X = V + H + V'H'$$

The V and H can be set up on the dials VD and HD and the factor V'H' on the dials VD' and HD'. In all modifications of the computer both addition and multiplication are involved and multiplication is brought in as a cross-product through the use of logarithmic cams coacting to operate an antilogarithmic cam which, in turn, affects a summation cord also operated by the linear cams.

Although I have described my computer in connection with a bombsight, this is only one application thereof and has been done only for the purpose of illustration. It may be made for solving many factors other than velocity, altitude, bomb characteristics, etc., and the cams can be contoured linearly or logarithmically, as disclosed, or as modified by constants or other functional relations. Also, they may be contoured other than in linear or logarithmic progression so as to take care of any characteristic which is neither linear nor logarithmic. Such characteristic may be determined empirically, although other methods may be used for determining a particular characteristic deviation from a linear or log pattern. The cams, if carefully contoured, may produce a computer in which departure from accuracy is much less than 1%; such computers are entirely practical for many applications.

Instead of the dials VD and HD being set manually, they may be set automatically by the motors M and M' in accordance with the air speed and altitude of the airplane as indicated by the air speed sensing element 18 and the pressure sensing element 38 respectively. These elements operate the motors M and M' which are of the follow-up type, and keep the dials VD and HD set constantly for any change in airspeed and altitude of the plane so that the bombardier does not have to pay any attention to these factors. He has only to set the bomb characteristic dial BD for the bomb type which is to be used and the effect of time of fall in sighting the target T through the telescope 92 will be fully compensated. When the target registers with the cross hairs in the telescope it is time to release the bombs in order that they will fall accurately on the target. The disclosed computer is shown for one described type of bombsight, but may be readily modified to operate in connection with other types.

From the foregoing specification it will be obvious that I have provided a cam operating means for a summation cord, the length of which is affected by the cams to perform an indicator or control function in accordance with several variables, as well as various constants and functional relations, some of which are multiplied and enter into an equation that has its result reflected on the indicator or the control mechanism. Multiplication is brought into the equation by a system of adding the logs of the factors and through a sub-summation cord operating an anti-log cam which, in turn, affects the main summation cord and hence the result. The terms multiplication and addition are used in their broader algebraic sense to include division and subtraction, respectively. The apparatus can be used for any equation desirable where the functional relations of the variables and constants involve both multiplication and addition, and is particularly adapted to bombsight operation with automatic setting for altitude above the target and air-speed, and manual setting for bomb type. Altitude above the target and air-speed can be set into the computer by means of a telemetric system from a remote altimeter and an air-speed responsive device. Bomb type setting is done by the bombardier in accordance with the type of bomb to be released.

The follow-up motors M and M' are operated from the altimeter and air-speed devices and rotate the shafts 10 and 28 automatically. Other settings, different than determined by the altimeter or the air-speed responsive device due to their inoperativeness or otherwise, can be done manually by manipulating the knobs 16 and 36, and yet the shafts 10 and 28 can be again connected with the worm gears 22 and 22a by the indexing clutches 24—26 and 24a—26a.

The sprocket connection 98—100—102 is necessary, as the shafts 28 and 40 must be both rotated in relation to altitude and the particular bomb which is selected. The indexing clutch 104—106 then permits shifts of shaft 40 to correspond to bomb type with assurance that each cam lobe will correspond to the position of the cams on the shaft 28 after each bomb type setting on the dial BD.

I have found that a computer composed of cams, cam followers and a summation cord is slightly more accurate when vibration is present. Vibration takes up slack in the summation cord, overcomes friction in the various parts of the computer, and takes up slop in the gear teeth, etc. When the computer is used on an airplane or other piece of machinery, vibration automatically occurs and it is not necessary to provide auxiliary apparatus for causing it if maximum accuracy is desirable.

In the subjoined claims I have found it convenient to make use of certain expressions which I will now define in terms of my invention. The effective length of a summation cord (cord 58 for example) is the length from its starting point 60 around all idler pulleys and cam follower pulleys, to its point of tangency with the drum 68 at its other end. A linear cam is one having a cam surface which for uniform rotation of the cam rises linearly with respect to a variable quantity which is a function of rotation of the cam. A logarithmic cam is one having a cam surface which rises at the logarithm of a variable quantity which is a function of the rotation of its shaft. An anti-logarithmic cam is one whose rise is in accordance with the anti-logarithm of the rotation of its shaft, such a cam being illustrated in Figure 6. The term "cord" is intended to include cable, braid, wire or any suitable strand capable of funicular function.

The term "cross product" is used to refer broadly to any second degree product such as a simple product HB or a compound product such as $V(H+B)$.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof. Throughout the claims I intend that functions of the variables shall mean constants, first and second degree relations, etc., as well as points determined statistically for arriving at the proper contours for cams in the computer in order to produce the desired resultant indicating or control function.

I claim as my invention:

1. In a computer, a pair of rotatable shafts, a summation cord, and means adjusting the effective length of said cord to a value determined by the sum of variable quantities which are functions of the rotations of said shafts and the product of said quantities, said means comprising linear and logarithmic cams driven by each said shaft, a pivoted antilogarithmic cam, followers for said cams, means driving said antilogarithmic cam in accordance with the movements of the followers of said logarithmic cams, and means engaging said cord to alter its effective length and movable with the followers of said linear and antilogarithmic cams.

2. In a computer, a principal summation cord, means fixing the position of one end of said cord, mechanically movable means fastened to the other end of said cord so that change in the effective length thereof may cause proportional movement of said means, a plurality of shafts, mounting means for said shafts, means for rotating said shafts through angles proportional to selected values of a plurality of primary variables, and means for adjusting the effective length of said cord to a value proportional to the sum of the values of a plurality of variable quantities which are functions of said primary variables and the cross products of said quantities, said last named means comprising linear and logarithmic cam means rotated by said shafts, logarithmic and antilogarithmic cam means pivoted for rotation independently of said shafts, subordinate summation cords controlling the position of said independently pivoted cams, and pulleys positioned by said linear cams and said separately pivoted cams and engaging said summation cords to vary the effective lengths thereof.

3. In a computer, a plurality of rotatable shafts, a summation cord, and means adjusting the effective length of said cord to a value determined by the product of a first variable quantity multiplied by the sum of two other variable quantities, the first quantity being a function of the rotation of one of said shafts and the two other quantities being functions of the rotations of two other shafts, said means comprising a logarithmic cam driven by said first shaft and linear cams driven by said other shafts, separately pivoted logarithmic and antilogarithmic cams, followers for said cams, means driving said separately pivoted logarithmic cam in accordance with the sum of the movements of the followers of said linear cams, means driving said antilogarithmic cam in accordance with the movements of the followers of both said logarithmic cams, and means engaging said cord to alter its effective length and movable with the follower of said antilogarithmic cam.

4. In a computer, a summation cord, means fixing the position of one end of said cord, mechanically movable means fastened to the other end of said cord so that change in the effective length thereof may cause proportional movement of said means, a pair of shafts, mounting means for said shafts, means for rotating said shafts through angles proportional to the value of a primary variable, including mechanical means connecting said shafts in driving and driven relationships in a selected ratio, cam means operated by said shafts, said cam means operated by one of said shafts having cam surfaces rising in conformity with functions of a first variable quantity which is a first function of said primary variable, the cam means operated by the other of said shafts having cam surfaces rising in conformity with functions of a second variable quantity which is a second function of said primary variable, and means, including pulleys positioned by said cam means, for engaging said cord to adjust its effective length to a value proportional to the sum of the values of said variable quantities and their product.

5. In a computer, a summation cord, means fixing the position of one end of said cord, mechanically movable means fastened to the other end of said cord so that change in the effective length thereof may cause proportional movement of said means, a pair of shafts, mounting means for said shafts, means for rotating a first of said shafts through an angle proportional to the value of a primary variable, means connecting the second of said shafts in driven relation to said first shaft so that the ratio of their rotation is a selected whole number, linear and logarithmic cam means driven by said first shaft and having cam surfaces rising linearly and logarithmically, respectively, in accordance with the value of a first variable quantity which is a function of the rotation of said first shaft and therefore of said primary variable, multi-lobed linear and logarithmic cam means driven by said second shaft, the number of lobes of each said multi-lobed cam means being said selected whole number, corresponding lobes of said cam means having cam surfaces rising linearly and logarithmically, respectively, in accordance with the value of a second variable quantity which is a different function of the rotation of said first shaft, independently pivoted antilogarithmic cam means, followers for said cam means, means actuating said antilogarithmic cam means in accordance with the sum of the displacements of the followers of said logarithmic cam means, means engaging said cord to adjust its effective length in accordance with the sum of the displacements of the followers of said linear cam means and said antilogarithmic cam means, whereby to cause movement of said movable means proportional to the sum of the values of said variable quantities and their product, and means for adjusting said second shaft relative to said connecting means and independently thereof to cause rotation of said second shaft in steps of that fraction of a revolution whose numerator is 1 and whose denominator is said whole number.

JOHN M. ANDERSON.

REFERENCES CITED

The following references are of record in the file of this patent:

UNITED STATES PATENTS

| Number | Name | Date |
|---|---|---|
| 1,456,061 | Jowett et al. | May 22, 1923 |
| 2,193,929 | Lion | Mar. 19, 1940 |

FOREIGN PATENTS

| Number | Country | Date |
|---|---|---|
| 291,556 | Italy | Dec. 19, 1931 |
| 291,841 | Great Britain | June 5, 1928 |
| 396,837 | Great Britain | Aug. 17, 1933 |
| 432,395 | Germany | Aug. 5, 1926 |
| 595,554 | France | July 20, 1925 |
| 837,822 | France | Nov. 18, 1938 |
| 841,504 | France | Feb. 6, 1939 |